United States Patent [19]

Tornabene

[11] 4,048,801

[45] Sept. 20, 1977

[54] PROCESS AND DEVICE FOR HARNESSING WAVE ENERGY

[76] Inventor: Michael G. Tornabene, 285 Oak Neck Lane, West Islip, N.Y. 11795

[21] Appl. No.: 567,127

[22] Filed: Apr. 11, 1975

Related U.S. Application Data

[63] Continuation-in-part of Ser. No. 428,349, Dec. 26, 1973, abandoned, and Ser. No. 432,211, Jan. 10, 1974, abandoned, and Ser. No. 566,985, April 10, 1975, and Ser. No. 566,983, April 10, 1975, and Ser. No. 566,984, April 10, 1975.

[51] Int. Cl.² ............................................. F03G 7/10
[52] U.S. Cl. ........................................ 60/502; 60/505
[58] Field of Search ................................. 60/497–507; 417/332; 290/53, 54

[56] References Cited

U.S. PATENT DOCUMENTS 1,823,190  9/1931  Christie .................................. 60/506
3,259,361  7/1966  Cantu ..................................... 60/505

Primary Examiner—Allen M. Ostrager

[57] ABSTRACT

In a preferred embodiment of the invention, a plurality of spherical float elements mounted on levers which levers are each mounted for reciprocation along elongated axes thereof substantially vertically thereof to the sea bottom, with interconnected drive shafts for mutually contributing to a common drive, the plurality are arranged with forward and rearwardly and laterally off-set-spaced floats relative to one another and relative to a direction of wave movement from forwardly to rearwardly, such that energy in the form of water pressure waves above and below the water surface are deflected laterally and rearwardly from the forward float elements to the rearward elements to impel against the rearward elements together with the impelling of the normal waves or residual waves also impelling against each of forward and rearward waves, and the process of arranging the plurality of spherical float elements and of harnessing the deflected energy thereby.

9 Claims, 6 Drawing Figures

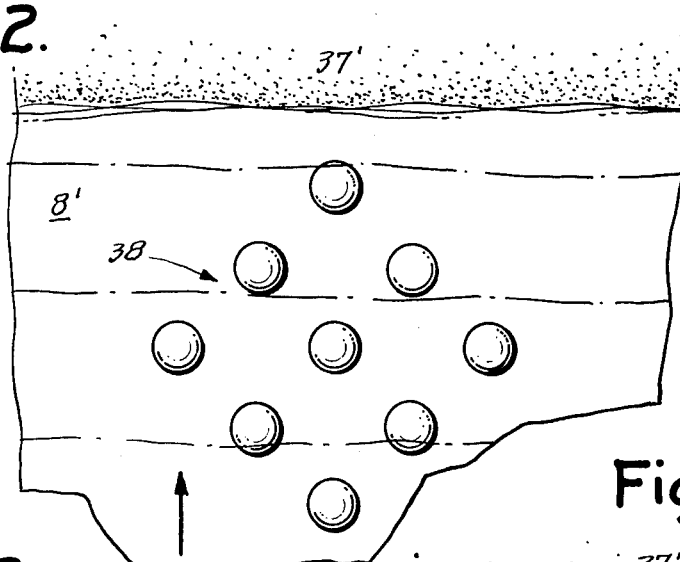
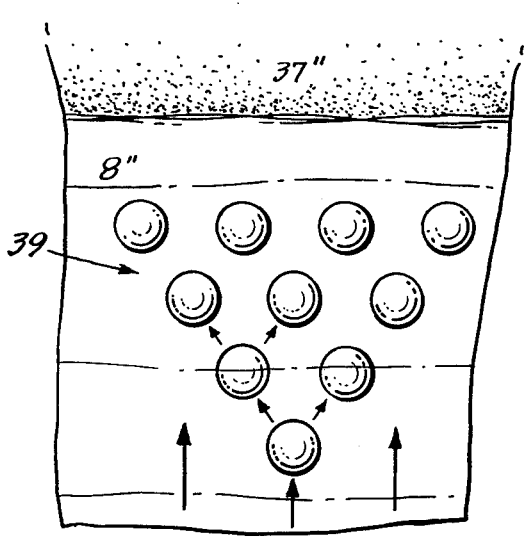
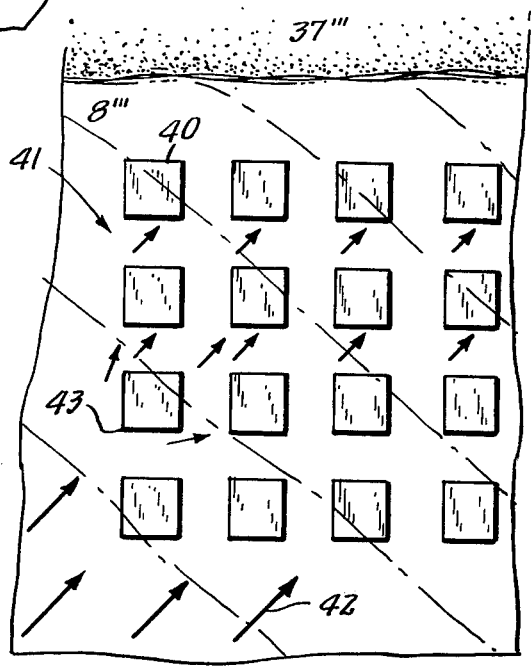
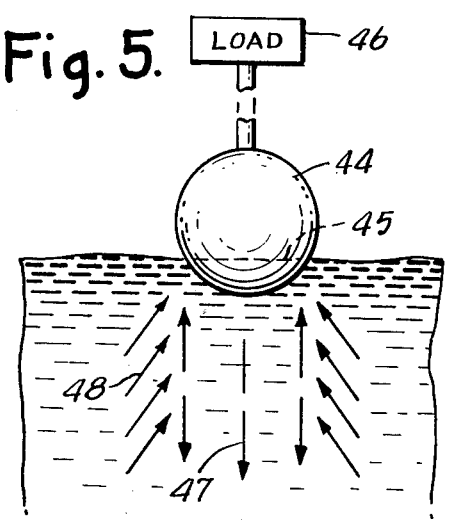
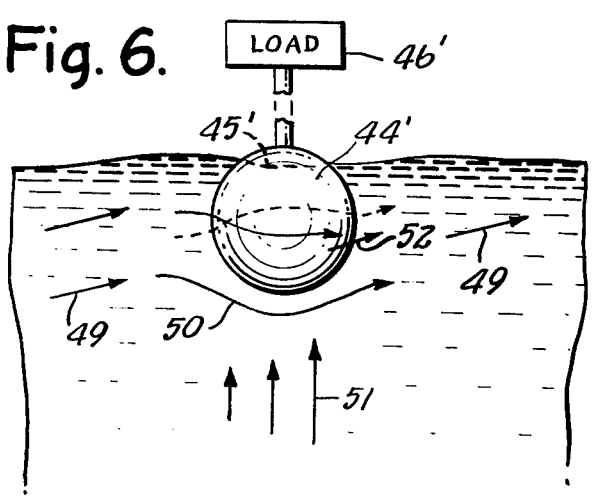

PROCESS AND DEVICE FOR HARNESSING WAVE ENERGY

This invention relates to a process and mechanism of harnessing wave energy, and this is a continuation in part of each of the parent applications:

1. A WAVE-ACTION POWER CONVERSION APPARATUS filed on Dec. 26, 1973; filed as Ser. No. 428,349, now abandoned;
2. WAVE-ACTION POWER CONVERSION APPARATUS filed Jan. 10, 1974, filed as Ser. No. 432,211, now abandoned;
3. A GEAR DEVICE AND WAVE-ACTION COMBINATION filed Apr. 10, 1975, filed as Ser. No. 566,985;
4. A WAVE-ACTION POWER CONVERSION APPARATUS filed Apr. 10, 1975, filed as Ser. No. 566,983;
5. IMPROVED WAVE-ACTION POWER CONVERSION APPARATUS filed Apr. 10, 1975, filed as Ser. No. 566,984.

BACKGROUND OF THE INVENTION

Prior to the present invention it had been the common belief tht if a series of rows of spaced-apart floats were subjected to waves hitting consecutively the floats in the consecutive ones of the series, that the first would drain the major amount of energy from the wave and subsequent ones would have solely residual energy of the wave and not be of much benefit in so far as any energy that might be captured from the upward and downward reciprocation of the subsequent floats. Also, according to very sophisticated mathematics, diminishing returns were obtained by any such system, and also by such mathematics, the amount of energy that could foreseeably be obtained was expected to be inconsequential to a degree of insignificance, in so far as having any commercial potential to industry and public utilities or the like.

SUMMARY OF THE INVENTION

Objects of the present invention, when experimentation was begun with controlled man-made waves fully simulative of sea and ocean waves, were to discover new methods and combinations of equipment for enhancing the harnessing of wave energy.

Other objects become apparent from the preceding and following disclosure.

One or more objects of the invention are obtained as disclosed herein.

Broadly the invention may be defined as a method of harnessing wave energy, using the term "wave" to include main body water pressure waves below the waters surface, for example as in the nature of ground swells or other currents and water pressure waves as caused by natural and/or artificial sea bottom partial obstructions and/or baffles, as well as to include surface waves as conventionally recognized by the average person, by placing a plurality of floats in a stepped relationship both laterally and rearwardly spaced from one-another with predetermined spacing as carefully precalculated preferably, for most efficient results, such that exact angles of deflection of water pressure waves and the angles of incidence thereof to properly impel against the laterally and rearwardly spaced others of the floats, with the unexpected discovered results that the amount of energy harnessed by the rearwardly spaced floats (also laterally off-set, as noted above, at least in preferred embodiments) yield unexpected much greater amounts of harnessed energy than was determinable by mathematical calculation heretofore, as well as the greater strokes — the length of the stroke being indicative of the measure of greater energy being harnessed — being obtained for rearwardly located floats, rather than for the front line or first one or two rows of floats, for example, this being entirely unforeseeable by the inventor and by experts in the field.

Although the inventor is not to be bound by theory, it appears that there are deflected pressure waves from at least three different sources, namely conventional reflection or deflection after the initial wave hits the leading float, for example, and secondly from a turbulence cause as the wave precedes upward movement of the float which lags behind because the wave has to rise sufficiently that bouyancy has increased sufficiently to overcome the downwardly-pressing work load, and thirdly from the float temporarily hanging at the top of its stroke on the lever until the water of the wave has dropped sufficiently that the pull of gravity on the float mass (and lever mass, etc.) is sufficient to overcome the work load tending to hold the float and lever in the elevated position at the top of the last stroke, turbulence occuring beneath the float during this third method or mechanism here noted as if to fill-in the gap left void by the float which is momentarily left at the top of the stroke, and then the float surges downwardly to again displace the water fully, and also with thus a greater momentum and acceleration, with a resulting greater inertia being built up thus magnifying the length of the stroke, as well as causing additional water pressure forces to thereafter affect the adjacent floats spaced therefrom.

Further enhancing the yield together with the aforementioned employment of the predetermined pattern of arrangement of a plurality of floats, are deflectors of several types which have given exceptionally good results. For example, a sea bottom barrier deflects the water currents upwardly to agitate the water, and other deflectors aid in their vertical positioning from the sea bottom or close thereto typically, to direct waves and the main body of the water more directly into the plurality of arranged floats when the tide and/or direction of waves and/or currents might be coming naturally from a less desirable direction relative to the pattern of positioned floats, to thereby enhance the energy harnessing by the floats.

In a still other preferred embodiment, the levers of the individual floats are interconnected with each other to effect a common drive, making use of slip-clutches such that normally all contribute to the overcoming of the load, but such that a driving shaft from one or more floats may lag behind and later join in the driving action of a common shaft, for example. However the invention is obviously not limited to mere drive-shaft types of unified driving, any desired conventional system being within the scope of the invention, as well as possibly each float having its own support structure supporting its individual electrical generator.

THE FIGURES

FIG. 1 illustrates diagrammatically in perspective view a vast area of the sea or ocean having floats mounted on typically upright upwardly extending levers reciprocatable along the elongated axes thereof by action of the waves and water pressure waves acting upon the floats individually and as a unit to pool harnessed energy. There are illustrated sea bottom wave and turbulence devices, as well as deflectors of the main body of water, variably mounted as to the direction of adjustment.

FIG. 2 and FIG. 3 and FIG. 4 each illustrate diagrammatically differing arrangements and shapes, respectively, of a plurality of floats relative to known directions of waves and/or tides, or the like, in elevation plan.

FIG. 5 illustrates the position of a float as the water recedes therefrom leaving the float partially suspended until the water has receded sufficiently for the mass of the float and other associated mass to cause the float to surge downwardly, showing direction typically of water currents as substantially has been verified by photography, shown in side view diagrammatically.

FIG. 6, in a view also in side view and also diagrammatic, shows the position at the peak of the downstroke after the wave water has begun rising momentarily before the upsurge of the float, there temporarily resulting a turbulence of water as shown, as substantially verified by photography.

DETAILED DESCRIPTION

Figure 1:
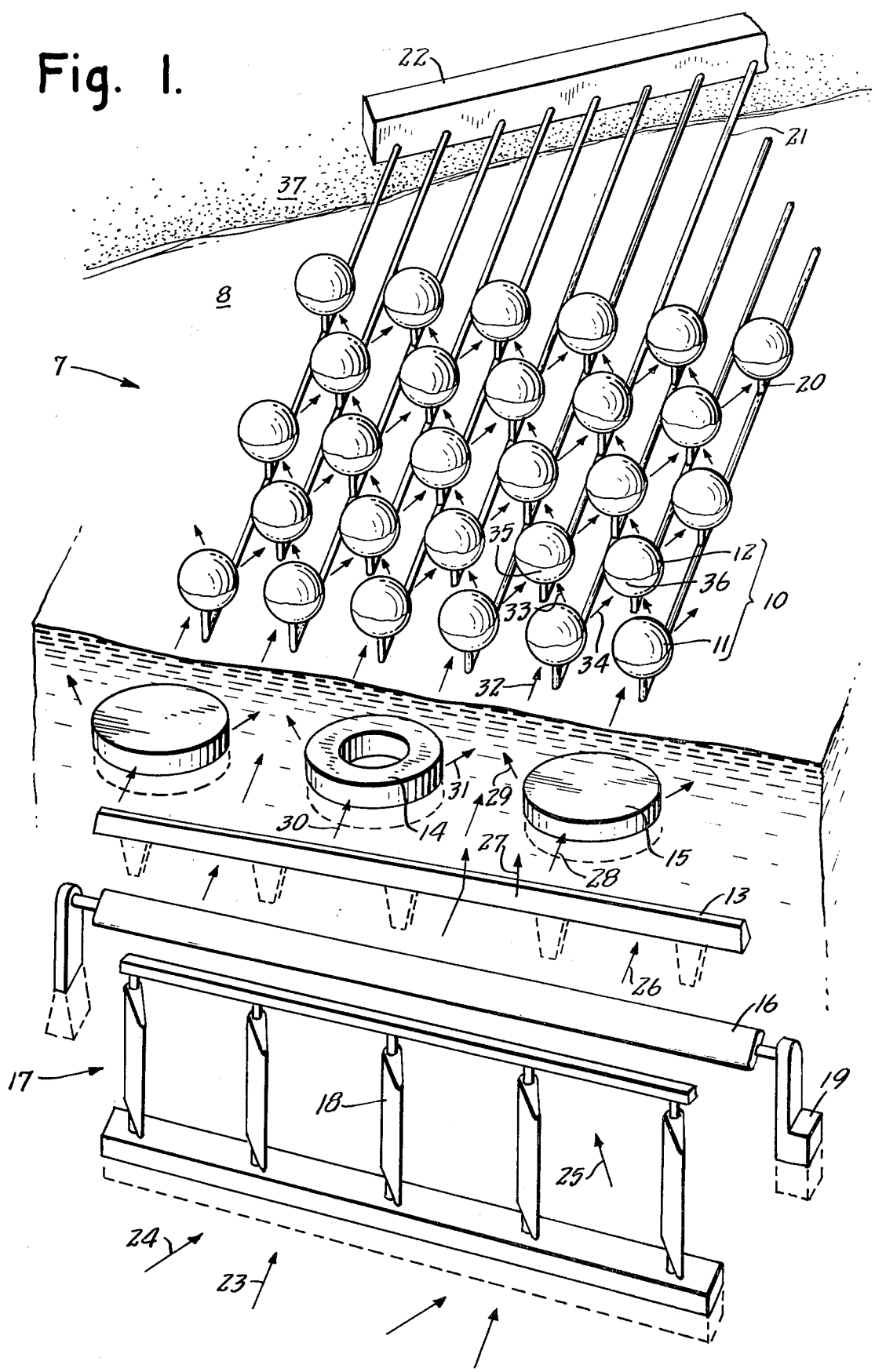

FIG. 1 illustrates a set of plurality of floats as set 7 of floats 10 including forward float 11 and rearward float 12, and a sea bottom deflector 13 shown in underwater 9 of water body 8, and other turbulance producers 14 and 15, and variable horizontal deflector 16 motored by diagrammatic control and motor 19, and the float levers 20, and the common drive shaft 21 and further common machinery 22 on the land 37; the main body of water 8 normally flows in direction 23 but at other times in direction 24 whereupon water in direction of flow direction 24 is deflected in direction 25 by the deflectors, the set 17 including individual deflectors 18. Water flowing beneath the surface as direction 26 is deflected into direction 27 upwardly angularly; water moving in direction 30 and 28 generally, is beneath the surface deflected by the deflector 14 in direction 31 and deflector 15 in direction 29. Surface water waves moving in direction 32 results in residual water pressure waves 33 and 34 to strike surfaces 35 and 36 respectively.

FIG. 2 illustrates the shore 37' and the body of water 8' having the spherical floats' set 38 in the arrangement shown relative to the arrow direction of waves/current or the like.

FIG. 3 illustrates the shore 37'' with the body 8'' having the set 39 of floats relative to the main body of water flow shown and with the already explained residual deflected waves.

FIG. 4 illustrates the set 41 in water body 8''' relative to shore 37''', of square cross-sectioned-shaped (not shown in cross-section) in a horizontal plane, positioned to cut the water coming in the direction 42 of current flow or wave movement relative to the corners 43 of the square shapes of the floats 40.

FIG. 5 illustrates the float 44 and water level 45 and the tubulance water flow direction 48 and 47 as the wave recedes, and load 46. FIG. 6 illustrates the float 44' and water level 45 before it moves upwardly and the deflected water turbulence 52 and 50, and the normal current direction, typically, in direction 49.

It is within the scope of the present invention to make such variations as would be apparent to a person of ordinary skill.

I claim:

1. A process for harnessing energy comprising in combination: employing in water, a plurality of float means in a predetermined pattern of positioning individual ones of said plurality relative to one another in off-set spaced-apart predetermined relationships to one-another at predetermined distances from one-another with a first one being obliquely rearwardly spaced relative to a second one and relative to a direction of substantially lineal direction of primary pressure movements of a body of water, said predetermined distances being within a range of dimensions sufficiently small and sufficiently great such that a first pressure energy wave within the body deflects obliquely and at least one of rearwardly and forwardly from said second one of said plurality to thereafter impel against said first one of said plurality at least in part coincident with another pressure energy wave within said water, each float means being of a predetermined shape and positioned such that the first pressure wave is deflected obliquely in the direction of a rearward float whereby the remaining energy of the wave may be utilized.

2. A process for harnessing energy, of claim 1, including lever means connected to said plurality such that upward and downward movement of each float means is converted into a driving harnessed force driving at least one element of a machine combination, and converting energy of waves and of said pressure energy waves into mechanical energy by employing said lever means fixedly attached to said plurality.

3. A device for harnessing energy comprising in combination: a plurality of float means positioned within a body of water in a predetermined pattern of positioning individual ones of said plurality relative to one another in off-set spaced-apart predetermined relationships to and at predetermined distances from one another, in which at least a rear one of the plurality is obliquely rearwardly of a forward one of said plurality and relative to a direction of substantially lineal direction of primary energy-pressure movement of the body of water, said predetermined distances being within a range of dimensions sufficiently small and sufficiently great such that a first pressure energy wave of a main portion of moving water moving from forwardly to rearwardly in direction deflects obliquely and at least one of rearwardly and forwardly, from the forward one of said plurality to thereby thereafter impel against said rearward one of said plurality at least in part coincident with another pressure energy wave within said water, each float means being of a predetermined shape and positioned such that the first pressure wave is deflected obliquely in the direction of a rearward float whereby the remaining energy of the wave may be utilized.

4. A device for harnessing energy, of claim 3, including lever means for converting upward and downward movement of each of said plurality into harnessed driving force, said lever means being connected with said plurality such that wave energy of said main body of water is converted into mechanical energy of the lever means.

5. A device for harnessing energy, of claim 4, in which said lever means interconnects at least two of said plurality such that the two drive a common lever element, and including as a part of the lever means a lever element commonly connected to be driven by said two.

6. A device for harnessing energy, of claim 5, including spaced forwardly of said plurality a partial barrier to said main body of water, said barrier being positioned to be substantially vertical to a direction of movement of main flow of said main body and being positioned with regard to deflector surfaces thereof such that said main body is deflected toward said plurality, said partial barrier including said deflector surfaces as portions of deflector elements thereof.

7. A device for harnessing energy comprising in combination: a plurality of float means positioned within a body of water in a predetermined pattern in which at least a rear one of the plurality is obliquely rearwardly spaced from a forward one of said plurality and in spaced-apart relationship at predetermined distances and with each sid float means being of a predetermined shape, such that a pressure wave of a main body of moving water moving from forward to rearwardly in direction deflects obliquely rearwardly from the forward one to thereafter impel against the rearward one of said plurality, and spaced from said plurality a partial barrier to said main body of water, said barrier being positioned to be substantially vertical to a direction of movement of main flow of said main body and being positioned with regard to deflector surfaces thereof such that said main body is deflected toward said plurality, said partial barrier including said deflector surfaces as portions of deflector elements thereof, and being mounted on a sea bottom and variable positioning being a capability thereof.

8. A device for harnessing energy comprising in combination: a plurality of float means positioned within a body of water in a predetermined pattern in which at least a rear one of the plurality is obliquely rearwardly spaced from a forward one of said plurality and in spaced-apart relationship at predetermined distances and with each said float means being of a predetermined shape, such that a pressure energy wave of a main body of moving water moving from forward to rearwardly in direction deflects obliquely rearwardly from the forward one to thereafter impel against the rearward one of said plurality, and spaced from said plurality a partial barrier to said main body of water, said barrier being positioned to be substantially vertical to a direction of movement of main flow of said main body and being positioned with regard to deflector surfaces thereof such that said main body is deflected toward said plurality, said partial barrier including said deflector surfaces as portions of deflector elements thereof, and said partial barrier being embedded within the sea bottom and extending partially above the sea bottom and being substantially rounded in a horizontal cross-section thereof.

9. A device for harnessing energy, of claim 8, in which said partial barrier is substantially annular at least at an upper surface thereof.

* * * * *